United States Patent
Ibrahim et al.

(10) Patent No.: US 6,563,864 B1
(45) Date of Patent: May 13, 2003

(54) RESIDENTIAL POWER CUTBACK FOR SPLITTERLESS DSL OPERATION

(75) Inventors: Yaser Ibrahim, Dallas, TX (US); Michael O. Polley, Richardson, TX (US); Ralph E. Payne, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/216,082

(22) Filed: Dec. 18, 1998

Related U.S. Application Data
(60) Provisional application No. 60/073,613, filed on Feb. 4, 1998.

(51) Int. Cl.[7] .................................................. H04B 1/38
(52) U.S. Cl. ....................... 375/222; 375/225; 370/487; 379/93.01
(58) Field of Search ................................ 375/222, 225, 375/275, 216; 370/487, 480, 483; 379/93.01, 92.03, 92.04, 410, 406.14, 398, 394, 416, 406.13, 406.08, 406.1, 406.15

(56) References Cited

U.S. PATENT DOCUMENTS

| | | | | |
|---|---|---|---|---|
| 4,757,495 A | * | 7/1988 | Decker et al. ............... | 370/477 |
| 5,901,205 A | * | 5/1999 | Smith et al. ............. | 379/93.01 |
| 6,061,392 A | * | 5/2000 | Bremer et al. ............... | 370/468 |
| 6,101,216 A | * | 8/2000 | Henderson et al. .......... | 375/222 |
| 6,151,335 A | * | 11/2000 | Ko et al. ..................... | 370/487 |
| 6,192,109 B1 | * | 2/2001 | Amranay et al. ............. | 379/30 |
| 6,212,227 B1 | * | 4/2001 | Ko et al. ..................... | 375/222 |
| 6,226,322 B1 | * | 5/2001 | Mukherjee ................... | 375/229 |
| 6,263,077 B1 | * | 7/2001 | Zuranski et al. ............. | 379/410 |
| 6,269,154 B1 | * | 7/2001 | Chellali et al. .......... | 379/93.28 |

OTHER PUBLICATIONS

Amrany et al., Method for Determining Off–Hook Condition of a Telephone, Dec. 24, 1997, pp. 3–4, Provisional Application No. 60/068,676.*
Aware, Inc., ITU–Telecommunication Standardization Sector, Splitterless G.Lite interoperability with ANSI T1.413 and/or G.DMT, Oct. /27–29, 1997.
Aware, Inc., ITU—Telecommunication Standardization Sector, Splitterless DMT System Design and Measurements, Oct. 27–29, 1997, www.aware.com/dsl–lite/.
Aware, Inc., "Aware: The Source for DSL–Lite".
Efficient Networks, Inc., "Efficient Networks Demonstrates 'Splitterless' DSL Modem," June 1, 1998 www.efficient.com/new/press_98/pr_splitterless.html.

* cited by examiner

Primary Examiner—Chi Pham
Assistant Examiner—Khanh Cong Tran
(74) Attorney, Agent, or Firm—Pedro P. Hernandez; W. James Brady III; Frederick J. Telecky, Jr.

(57) ABSTRACT

A digital subscriber line modem (30) capable of operating with multiple transmission line profiles depending on the current transmission line characteristics of a wire line pair (20) includes an interface (212, 292) to the wire line pair (20) and a signal converter (214, 290) with a terminal coupled to the interface. An on/off-hook detector(300) drives an impedance analyzer function (304) that is able to measure transmission line parameters based on the current line characteristics of the wire line pair (20). A control logic block (310) performs the actions required to adapt to a new line conditions of the wire line pair (20) and rapidly adapt to the new on/off hook condition.

50 Claims, 4 Drawing Sheets

RESIDENTIAL POWER CUTBACK FOR SPLITTERLESS DSL OPERATION

This application claims priority under 35 USC §119(e)(1) of provisional application Ser. No. 60/073,613, filed Feb. 4, 1998.

TECHNICAL FIELD

The present invention relates in general to high rate digital transmissions over existing telephone lines including local subscriber loops and more particularly to a method and system of connecting telephones and high rate modems directly to the same telephone line without a splitter.

BACKGROUND OF THE INVENTION

The increased use of telephone twisted pair wiring for data communications has resulted in a push for faster modems and improved signaling protocols compatible with the public switch telephone network (PSTN). An example includes the emerging modem communication standards which have pushed the limit of transmission speeds close to 56 Kbps. Another example includes the emerging variety of the DSL communications protocols including asymmetric digital subscriber line (ADSL), symmetric digital subscriber line (SDSL), high bit rate digital subscriber line (HDSL), and very high rate digital subscriber line (VDSL). Each DSL variant represents a different transmission speed over a different distance of copper pair wiring. Currently, industry is producing equipment capable of implementing one or more of the DSL protocols. Modems, routers, line cards, and digital loop carrier systems are all examples of such equipment.

In principle, a DSL modem and a plain old telephone system (POTS) or other voice band device can operate simultaneously over the same wire line pair since they use different frequency bands. The connection, however, of a POTS to the same wire line pair as a DSL modem can suffer from several problems that result from the change in input impedance of the POTS as it is added to the line. In essence, a POTS is not designed to handle frequencies outside the voice band of 300–3.4 kHz. In addition, a POTS often contains nonlinear components that may create harmonic interferences. Examples of such nonlinear components include Zener diodes, transistors, varistors, triacs, and other devices used for overvoltage protection, sidetone generation and overvolume protection. For specific details on the circuitry of the POTS, reference is made to Whitman D. Reeve, "Subscriber Loop Signaling and Transmission Handbook: Analog," IEEE Press, 1992, included herein by reference.

In a splitterless configuration, when the POTS goes off-hook during a DSL transmission, these components can distort the DSL signal causing intermodulation and producing nonlinear echos of the upstream DSL signal. Harmonics of these echos lie in the downstream DSL band, and thus severely corrupt the downstream signal. To overcome these problems, a POTS splitter may be used to isolate the DSL high frequency signals from the voice band frequencies.

In principle, a splitter is a combination of low-pass and high-pass filters. The low-pass filter is used to isolate the voice band signals and route them to/from the telephone and the central office. The high-pass filter is used to isolate the passband DSL signal and route it to and from the DSL modem and the central office. The splitter can be part of the DSL modem, in which case the telephone(s) has to be connected to the modem. Alternatively, the splitter can be installed at the line drop to the home, which may require professional installation and re-wiring of the telephone lines going to the DSL modem inside the customer premises.

Besides the installation issues which the customer may be faced with, the use of a splitter in a DSL modem adds to the overall complexity and cost of the user's communication equipment. The filters, transformers, resistors and other discrete components needed to implement a particular splitter design can be bulky and expensive. In addition, the application programs and the control logic necessary to operate the splitter and cause it to activate voice band or DSL filtering functions also increase overall complexity of the system. Utilizing separate connections for the voice band and DSL functions would allow the subscriber to utilize separate devices, although such a configuration restricts the way a customer can connect the equipment and adds the costs of a separate line. It would be advantageous to utilize a DSL modem in the same manner in which voice band modems are currently operated.

SUMMARY OF THE INVENTION

The present invention is a solution for connecting a POTS and DSL modem directly to the same line without a splitter, thus enabling the customer to plug the DSL modem and a normal telephone in any phone jack in the home similar to the way voice band modems are installed.

According to one embodiment, the invention discloses a communications device that accommodates changes in transmission line characteristics over a wire line pair that connects a customers plain old telephone system (POTS) to the central office or other centralized call exchange facility. The device includes a transceiver with an analog interface coupled to the wire line pair and arranged to communicate with the central office. An on/off-hook detector is coupled to the analog interface and arranged to detect when the POTS seizes the line corresponding to the off-hook state of the POTS. The device includes an impedance analyzer function coupled to the on/off-hook detector and the analog interface with an output so that the difference of line impedance between the on-hook and off-hook conditions of the POTS can be determined. The output of the impedance analyzer function is fed to a control logic function that is configured to adjust the transmission parameters of the transceiver in response to changes in the transmission characteristics of the line pair.

The communications device is able to compute and store transmission line profiles corresponding to the on-hook and off-hook states of the POTS. Since the impedance of the customer premise equipment changes as the POTS goes from on-hook to off-hook, the transmission line profiles contain transmission line parameters which the communications device can use to avoid the effects of nonlinearities produced as the POTS transitions between states. The transmission line parameters can include the transmission power levels, echo cancellation coefficients, and equalizer coefficients used by the transceiver during a DSL connection.

In another embodiment, disclosed is a digital subscriber line (DSL) modem capable of operating with multiple transmission line profiles depending on the current line characteristics of a wire line pair coupling a customer to the central office. The DSL modem includes an interface to the Wire line pair and a signal converter with an output terminal coupled to the interface. An on/off-hook detector drives an impedance analyzer function that is able to measure and produce a figure of the impedance presented to the wire line pair by the combination of the DSL modem and the voice band equipment. The impedance analyzer function is coupled to control logic which, in turn, is configured to determine the transmission line characteristics of the wire line pair as the voice band device transitions between states.

In one embodiment, the DSL modem includes a memory space, such as Random Access Memory (RAM), EEPROM, Flash memory, magnetic hard disk, or other suitable memory configuration. The memory space is accessible by the control logic block and stores transmission line profiles computed by the impedance analyzer function and the control logic block. The profiles can contain transmission line parameters corresponding to the on-hook and off-hook conditions of the voice band device coupled to the wire line pair. Examples of such transmission line parameters include the upstream power, echo cancellation and equalizer coefficients used by the DSL modem transceiver during on-hook and off-hook operation of the voice band device. In one embodiment the DSL modem is able to dynamically switch from one transmission line profile to another as it detects transitions of the voice band equipment between states.

Also disclosed is a method of simultaneously operating a digital subscriber line modem and a voice band device, such as a telephone or voice band modem, over the same connection. The method includes detecting when the voice band modem is on-hook and creating an on-hook transmission profile for the DSL modem which is used to maintain a DSL session over the connection when the voice band device is on-hook. The method could also include the steps of detecting when the voice band device is off-hook and creating an off-hook transmission profile for the DSL modem that is used to maintain a DSL session over the connection when the voice band device is off-hook.

The on-hook and off-hook transmission profiles can be stored for future use during the on-hook and off-hook conditions of the voice band device, respectively. The transmission profiles include a set of transmitter and receiver co-efficients that permit the DSL modem to operate within a substantially linear operating region directly coupled voice band telephone equipment. The coefficients can include the equalization and echo cancellation coefficients used by the transmitter and receiver sets of a DSL modem. In creating the off-hook transmission profile, the power of the DSL modem can first be reduced resulting in less intermodulation distribution by the voice band smaller harmonics being generated near the voice band spectrum and the DSL receiver spectrum. The on-hook and off-hook transmission profiles can be recalled by the DSL modem depending on the current state of the voice band device. The recall of transmission profiles can occur dynamically as the voice band device transitions from on-hook to off-hook. This provides near-uninterrupted use of both the voice band device and the DSL modem over the same connection.

Also disclosed is a method of training a DSL modem to operate simultaneously over the same connection as a voice band device. The method includes the steps of placing the voice band device in an on-hook state and establishing a DSL connection followed by explicit storage of the on-hook transmission profile. The training signals are analyzed in order to determine a set of on-hook transmission coefficients that allow simultaneous operation of the DSL modem with the voice band device in the on-hook state. The on-hook transmission line coefficients can be saved for future use as an on-hook profile.

The method can also include the steps of placing the voice band device in an off-hook state while transmitting a single pilot tone in the upstream direction that is analyzed in order to determine the linear and nonlinear operating ranges of the voice band device and the levels at transmit attenuation that must be applied in the DSL modem. Next, a set of off-hook transmission line coefficients that allow simultaneous operation of the DSL modem with the voice band device in the off-hook state are computed. The transmit attenuation and the coefficients permit the DSL modem to avoid the non-linear amplitude regions of the voice band device in its off-hook state. The off-hook transmission line coefficients can be stored for future use in an off-hook profile. In the most severe requirements for upstream power cutback, the use of a single pilot tone within an upstream communication channel provides a low rate upstream control channel.

An alternative method of training a DSL modem to operate over the same connection as a voice band device is disclosed. With the alternative method the voice band device is placed in an off-hook state and upstream power is reduced in order to increase the robustness of the transmission channel. In one embodiment, 4-Quadrature Amplitude Modulation (4-QAM) is used as the subchannel modulation protocol. The upstream power and subchannel modulation channels can be stored for future use by the DSL modem. In another embodiment, the upstream power level of the DSL modem is set to a predefined reduced level and never scaled either up or down. Alternatively, upstream transmissions can be reduced to a single pilot tone that could be modulated to provide a minimal very low rate upstream control channel.

An advantage of the invention is that it allows full asymmetric digital subscriber line performance when the voice band equipment is in the on-hook state. In the off-hook state the system adapts parameters and allows the throughput to be reduced in order to limit interference effects caused by nonlinearities in the voice band.

Another advantage of the invention is that it permits a DSL modem design without a splitter and thus reduces the cost and complexity of customer premise equipment.

Still another advantage of the invention is that it permits concurrent and simultaneous use of the same wire line pair for both voice band and DSL communications.

BRIEF DESCRIPTION OF THE DRAWINGS

Other aspects of the invention including specific embodiments are understood by reference to the following detailed description taken in conjunction with the detailed drawings in which.

References in the detailed description correspond to like references in the figures unless otherwise indicated.

DETAILED DESCRIPTION OF PREFERRED EMBODIMENTS

The current invention provides a communications device such as a digitial subscriber line modem that can be used over the same wireline pair used by a plain old telephone system (POTS) by accommodating changes in transmission line characteristics that occur as the POTS goes from an on-hook state to an off-hook state.

Figure 1A:
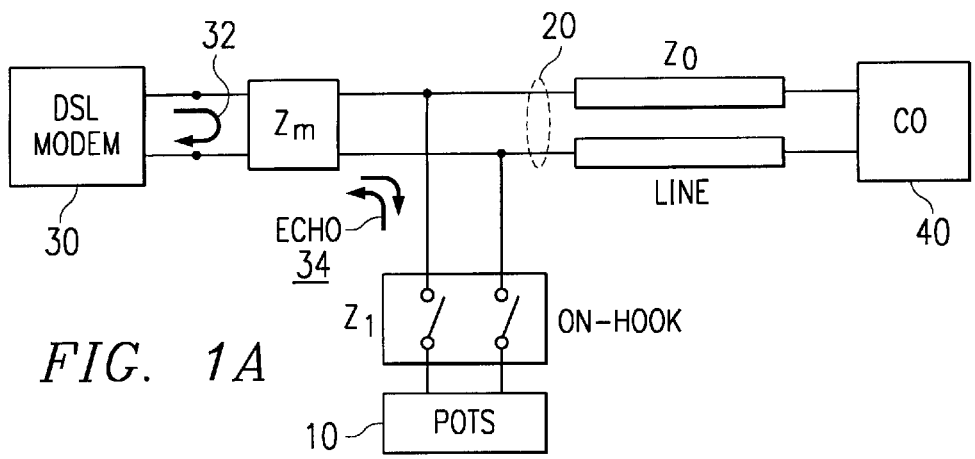
FIGS. 1a and 1b illustrate the on-hook/off-hook states of a plain old. telephone system coupled to a wire line pair.
Figure 1B:
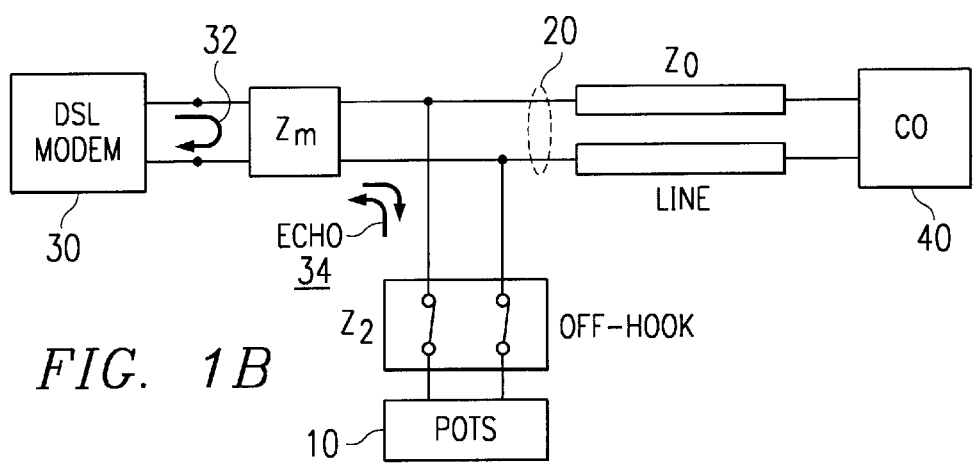

To better understand the invention, reference is made to FIGS. 1a and 1b which illustrate the effects of the POTS 10 on the wire line pair 20. Typically, the wire line pair 20 comprises of twisted copper pair connection of the type found in many public switch telephone network (PSTN) installations. As shown, the wire line pair 20 is used to connect subscriber side equipment such as the DSL modem 30 and POTS 10 to the central office 40 or other centralized call exchange facility dedicated for routing calls placed by a user of the DSL modem 30 or POTS 10. The DSL modem 30 is capable of implementing any one of the variant DSL protocols including symmetric digital subscriber line (SDSL), high rate digital subscriber line (HDSL), and very high rate digital subscriber line (VDSL). Each variant represents a different transmission speed over a different distance of copper line.

In general, DSL technology allows concurrent use of traditional voice band communications equipment and DSL equipment on the wire line pair 20. The POTS 10 represents a wide array of traditional telephonic equipment such as an analog telephone, fax machine, or other similar voice band device operating within the voice band frequency range of 30–3.4 kHz. While only a single POTS 10 is shown in FIGS. 1a and 1b, the methods described herein are applicable for communications environments that include a multitude of different telephone equipment connected to the wire line pair 20. For example, both a POTS 10 and a standard analog modem can be attached to the wire line pair 20. It is contemplated that additional transmission line profiles associated with the different combinations of devices coupled to the wire line pair 20 can be maintained.

The POTS 10 creates an impedance Z1 across the wire line pair 20 corresponding to on-hook operation of the POTS 10 as shown in FIG. 1A. For on-hook operation of the POTS 10, the wireline pair 20 has not been seized and the impedance seen by the DSL modem 30 (Zm) is equal to impedance of the POTS in on-hook state (Z1) in parallel with the impedance of the wire line pair (Z0). The line impedance Z0 is a function of the transmission line characteristics of the wire line pair 20 and can be affected by the resistance and length of the wire line pair 20, balance of the wire line pair 20, capacitance and other well known transmission line characteristics.

Impedance mismatches between the various devices coupled to the wire line pair 20 can create echos (indicated as the arrows in FIGS. 1A and 1B). For example, the upstream impedance (Zm) presented to the DSL modem 30 can create an echo signal 32 which must be subtracted by the receiver (not shown in FIGS. 1A and 1B) of the DSL modem 30 for proper signal resolution. The modulation protocols and echo cancellation functions in the DSL modem 30 are responsible for separating the echo signal 32 from the carrier receive signals. Typically, with POTS 10 in the on-hook state, the upstream impedance (Zm) is roughly equal that of the line impedance (Z0) resulting in a total line impedance that is predictable given the line transmission characteristics of the wire line pair 20.

In FIG. 1B, the POTS 10 has gone off-hook meaning that it has seized the wire line pair 20 and added an off-hook impedance value (Z2) to the overall upstream impedance (Zm) presented to DSL modem 30. Since the POTS 10 is designed to operate within the voice band of approximately 300–3.4 kHz, the addition of the POTS 10 to the wire line pair 20 can create nonlinearities in the upstream impedance (Zm) presented to the DSL modem. Such nonlinearities are caused by the existence of nonlinear components within the POTS 10 such as Zener-diodes, transistors, varistors, triacs and other similar devices, which may be used for overvoltage protection, side tone generation and/or overvolume protection. The resulting harmonics generated by the voice band circuitry can produce nonlinear echos in the entire DSL band as well as the voice band. These nonlinear echos are represented by arrows 32 and 34.

Figure 2:
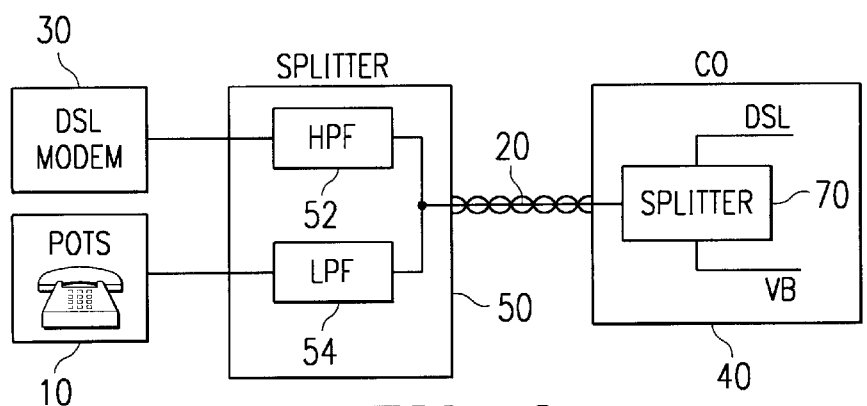
FIG. 2 illustrates the use of a splitter to isolate voice band and DSL signals in a communications system.

Thus, the upstream impedance (Zm) presented to the DSL modem 30 is a function of either (Z1) or (Z2) depending on the on-hook and off-hook state of the POTS 10. An attempt to overcome the effects of such nonlinearities is the use of a splitter 50 as shown in FIG. 2. The splitter 50 contains a high pass filter 52 and a low pass filter 54 which are used to isolate to the high frequency DSL signal content generated by the DSL modem 30 from the low frequency signals within the voice band generated by the POTS 10. If so configured, a second splitter 70 can be utilized at the central office 40 to separate the combined DSL and voice band signal spectrums which arrive over the wire line pair 20. In this way, the DSL modem 30 and POTS 10 can utilize the same wire line pair 20 to transmit signals to the central office 40.

Various splitter configurations are available and can be used to perform a similar function. For example, the splitter 50 can be part of the DSL modem 30 and the POTS 10 is connected to the DSL modem 30 through a port, jack or other connection mechanism. Alternatively, the splitter 50 can be installed at a line drop to the user's home which may require professional installation and rewiring of the telephone lines going into the DSL modem 30. In either case, the use of a splitter 50 increases the complexity of the customer side equipment and/or the cost associated with utilizing a DSL modem 30.

Also, the central office 40 must install the appropriate call handling equipment that is able to split the DSL content from the voice band content of signals arriving over wire line 20. This may mean obtaining a line card with an integrated signal splitter or other similar communications device.

Since the signals generated by the POTS 10 and DSL modem 30 reside in completely different spectrums, it is theoretically possible to use the same twisted pair connection 20 without the splitter 50. In order to accomplish this however, the DSL modem 30 must be able to handle the effects of nonlinearities created by the POTS 10 as it goes from an on-hook state to an off-hook state in normal operation.

The invention involves the use of a DSL modem 30 and POTS 10 over the same wire line pair 20 without a splitter 50. Preferably the DSL modem 30 is able to maintain two operating conditions: one corresponding to the on-hook state of the POTS 10 and another corresponding to the off-hook state. For each of the two conditions a set of parameters or transmission line coefficients for the transceiver in the DSL modem 30 are used. During the off-hook state of POTS 10, the upstream power of the DSL modem 30 is reduced in order to avoid the nonlinear amplitude regions of the nonlinear components in POTS 10. The fact that power is reduced in the DSL modem 30 during the time the POTS 10 is off-hook means that the signal is within the linear operating regions of the telephoe equipment circuitry and the harmonics and nonlinear echos generated by the POTS 10 are reduced.

Figure 3:
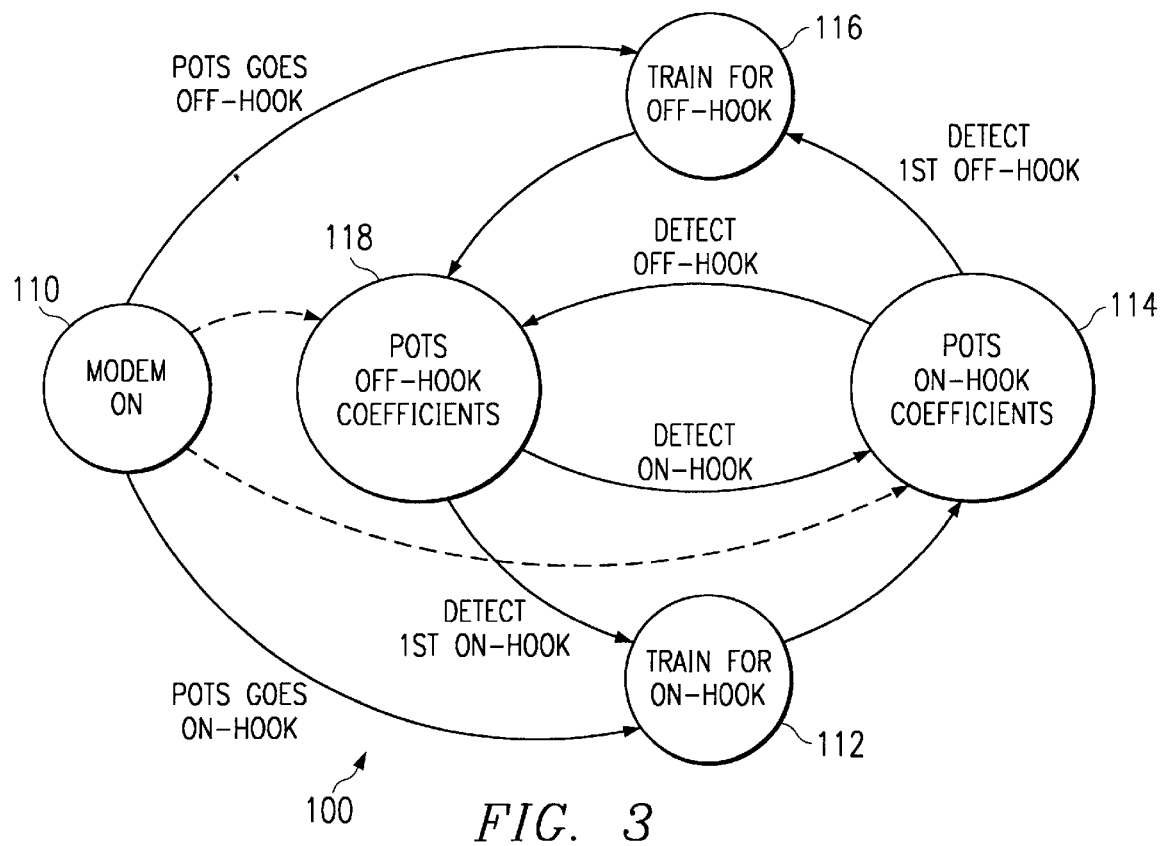
FIG. 3 is a state diagram illustrating splitterless operation of a DSL modem and voice band device over the same connection according to one embodiment.

In FIG. 3 a state transition diagram for a DSL modem 30 which can be used over the same wire line pair 20 as POTS 10 without a splitter is shown and denoted generally as 100. Initially, the DSL modem 30 is turned ON at state 110. If the POTS 10 is on-hook, the corresponding upstream line impedance (Zm) is equal to Z1 and a transition to state 112 occurs wherein the DSL modem 30 trains for the on-hook state. Next, at state 114 the DSL modem 30 calculates a set of transmission line parameters or coefficients which will be used to by the DSL modem 30 while the POTS 10 is on-hook. The DSL modem 30 maintains the on-hook coefficients derived at state 114 until it detects that the POTS 10 has gone off-hook.

Once the POTS 10 has gone off-hook corresponding to the configuration shown in 1B, the DSL modem 30 decides whether this is the first off-hook condition of the POTS 10 and if so, makes the transition to state 115. As before, the DSL modem 30 transition to the off-hook state of the POTS 10 by calculating a set of off-hook coefficients at state 118. Assuming the POTS has previously entered the off-hook state a direct transition from state 114 to state 118 is possible.

An alternative route for reaching state 118 exists when the DSL modem 30 has been turned ON while the POTS 10 is in an off-hook state. In this case the modem 30 proceeds to state 116 where it trains for the off-hook state of the POTS 10 by calculating, at state 118, a set of off-hook transmission line coefficients which can be used by the transceiver functions of the DSL modem 30. In one embodiment, the DSL modem 30 contains separate transmission profiles depending on the on/off-hook state of the DSL modem 30. In one embodiment, the DSL modem 30 can determine directly at state 110 whether it is at state 118 or state 114 depending on the on-hook or off-hook condition of the voice band device coupled to the wire line pair 20.

In either of the training states 112 or 116, the DSL modem 30 performs a training algorithm that would prepare it for operating in two distinct operating conditions. Preferably, a set of transmission line parameters or coefficients for the receiver and transmitter of the DSL modem 30 are used. The difference between states 112 and 116 is that the line impedance (Zm) seen by the DSL modem 30 is either Z1 or Z2 depending on whether the POTS 10 is on-hook or off-hook. In one embodiment, in the trained for off-hook state 116, the power of the DSL modem 30 is cut back before training is performed.

In the train for on-hook state 112, once the training process is completed the DSL modem 30 can transition between on-hook state 112 to a normal on-hook state 114 where the line impedance is Z1. In this condition, the power of the DSL modem 30 can be maintained at normal levels with the modem parameter coefficients used corresponding to the upstream impedance (Zm) being equal to Z1. The transmission line coefficients corresponding to on-hook operation of the DSL modem 30 can be seen as EC1 and FEQ1 or the on-hook echo canceller coefficients and equalizer coefficients, respectively. Several other transmission line parameters can be calculated including power cutback or transmit attenuation and gain settings. The echo cancellation coefficient EC and equalizer coefficients FEQ are used as examples of signal processing parameters that change with line conditions, but the invention contemplates adaptation of all signal processing functions required to best adapt the DSL modem 30 to either the on-hook state of off-hook state of one or more voice band devices coupled to the wire line pair 20.

If the DSL modem 30 was in the train for off-hook state 116, it can transition to the normal off-hook transmission state 118 where the line impedance (Zm) is Z2. In the off-hook state, the echo canceller coefficient is EC2 and the equalizer coefficients is FEQ2. The DSL modem 30 maintains in either of the two state 114 or 118 until a transition to another state is detected, e.g., going from on-hook to off-hook or vice versa.

The first time a on-hook/off-hook event is detected the DSL modem 30 can go through either of the training states 112 or 116 to compensate for the appropriate line condition and line impedance either Z1 or Z2. For example, if the DSL modem 30 began with on-hook training at state 112, the DSL modem 30 can automatically go to the train for off-hook state 116 adjusting modem parameters, such as the echo cancellation coefficients, only. In this way the DSL modem 30 can maintain two transmission line profiles with separate echo cancellation coefficients eliminating the need to train again and is able to switch between normal on-hook operation at state 114 and normal off-hook operation at state 118 whenever the corresponding oh-hook or off-hook event is detected. While these transitions can result in a loss of one or two data frames due to transients during the transition, the DSL modem can be configured to request a retransmission of these frames immediately following a specified transition.

Figure 4:
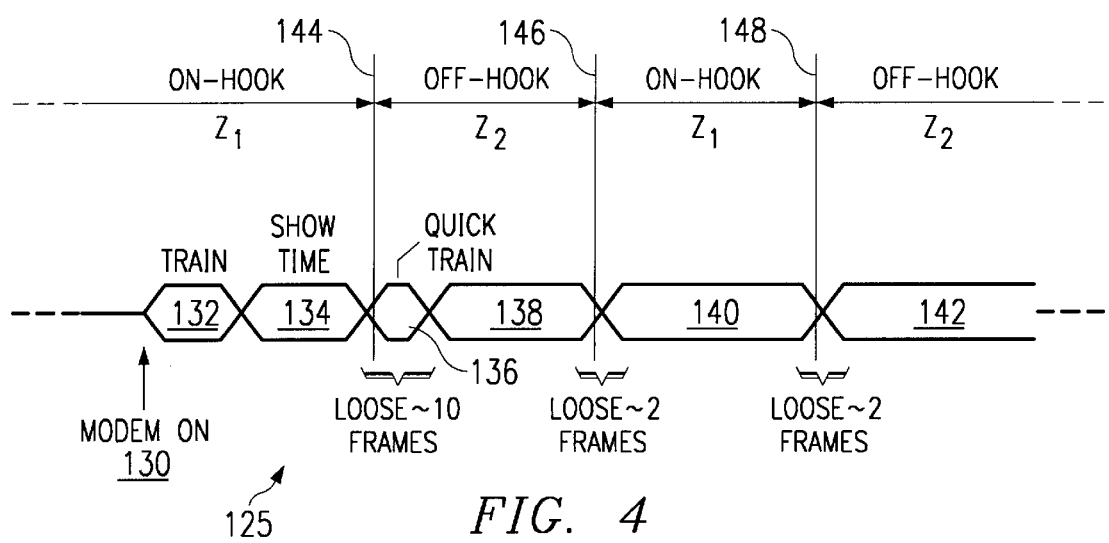
FIG. 4 shows the operational changes of a DSL modem as a voice band device coupled to the same wire pair line changes from on-hook to off-hook status.

Turning now to FIG. 4 a state transition diagram illustrates the operation of the DSL modem 30 versus line condition changes is shown and denoted generally as 125. Going from left to right, a subscriber can turn ON the DSL modem at 130 to initiate the train sequence corresponding to on-hook operation of the voice band device coupled to the same wire line pair as the DSL modem 30. The training sequence 132 is followed by a show time period 134 wherein the DSL modem 30 either operates in the on-hook condition or waits for a transition by the voice band device to the off-hook state where the line impedance is Z2.

A quick train cycle 136 is provided and occupies a shorter period than the regular training sequence 132 since it only requires adjusting the modem parameters within the modem's transceiver. At this point the DSL modem contains two separate sets of transmission line profiles and the corresponding modem parameters for reliable operation during on-hook and off-hook operation of the voice band device.

During the quick train sequence 132 it is possible for the modem to loose data frames that were transmitted from the beginning of the transition to off-hook to the end of the quick train sequence 136. For example, it is contemplated that the quick train sequence can be completed in approximately 10 data frames of a DSL signal stream. Thus, in one embodiment the DSL modem 30 is able to request a retransmission to obtain those frames lost during the training sequence 136. The retransmission request can occur in the data sequence labeled 138 of FIG. 4.

Future transitions from on-hook to off-hook can occur without any further training sequences. Further transitions between an on-hook state and an off-hook state may result in a loss of less data frames as compared to those lost during the regular training sequence 132. For example, during the transition from the sequence 138 to 140, the DSL modem 30 may loose one or two data frames due to transients between the off-hook state and on-hook state and the time necessary to retrieve and implement the correct transmission line coefficients for each state.

Likewise, a transition from the on-hook state to the off-hook state and the resulting data sequence 142 may result in a loss of one or two frames which the DSL modem 30 can recover by transmitting a retransmission request to the sending device. Other means of recovering lost data frames or preventing lost data frames can be implemented. For example, DSL modem 30 can be equipped with a memory array or buffer in which data from the customer premise equipment and/or signals from an upstream entity can be stored.

Figure 5:
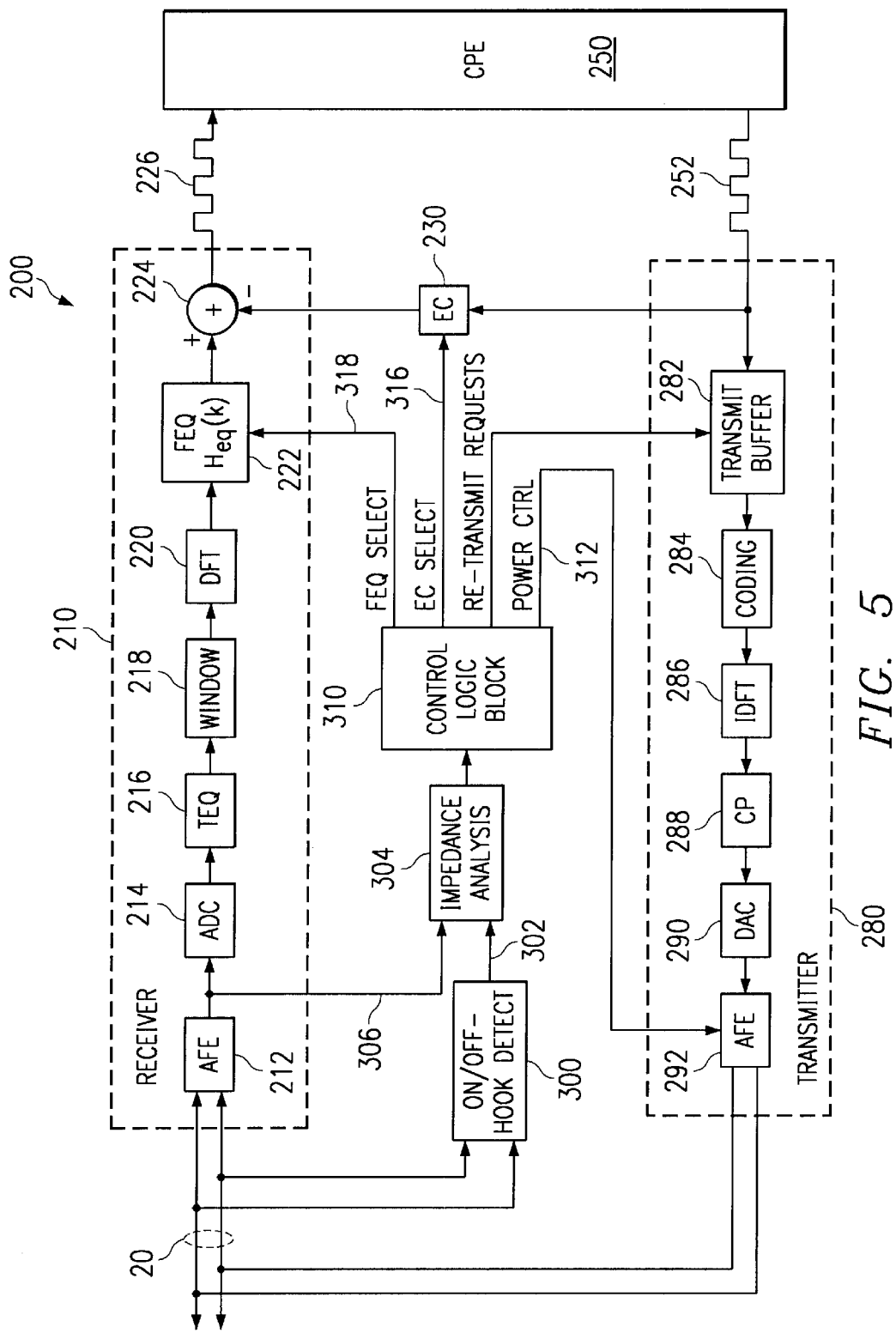
FIG. 5 illustrates the transceiver architecture of a DSL modem without a splitter according tone embodiment of the invention.

With reference to FIG. 5, therein is shown the transceiver architecture, denoted generally as 200, that can be used in a communication device such as DSL modem 30 to achieve the functionality of the present invention. As shown, the transceiver 200 contains a receiver 210 and a transmitter 280 which are configured to receive and transmit signals to and from the attached wire line pair 20 for upstream and downstream communications with the central office 40. In particular, a DSL modem 30 incorporating the transceiver 200 should be able to analyze the transmission line characteristics of the wire line pair 20 and determine a set of transmission parameters based on the on-hook or off-hook status of a voice band device coupled to wire line pair 20.

Signals arriving over the wire line pair 20 are received by the receiver 210 via the analog front end 212 which forms the interface to the wire line pair 20. The signals are converted by the analog-to-digital converter (ADC) 214 which is capable of sampling the incoming analog signal and producing a corresponding digitized sequence of numbers representing the analog signal.

The digital signal stream produced by the ADC 214 is presented to a Time Domain Equalizer (TEQ) function 216 which shortens the time domain impulse response of the entire analog channel. The TEQ function 216 forms an effective shortened channel whose impulse response has energy concentrated in a small number of samples. Preferably significant energy is concentrated in the same number of samples as are present in the digital sequence produced by the ADC 214.

A frame of data is formed and transmitted to the window 218 which holds the data prior to applying the Discrete Fourier Transform (DFT) function 220 on a complete frame or set of frames. The transformed signal at the output of the DFT function 220 is then processed by Frequency Domain Equalization (FEQ) function 222 which compensates for any channel distortion across the wire line pair 20. The output of the FEQ function 222 is a set of symbols that are delivered to the summing function 224 where echo cancellation is applied in order to separate true signals from reflected echo signals in the transceiver 200 and to produce output 226 which represents anequalized and demodulate symbol stream ready for handoff to the rest of the modem 250.

The function of the transmitter 280 is substantially the same as the receiver 210 but in reverse. In particular, digital signals 252 from the rest of the modem 250 are transmitted into the transmit buffer 282 within the transmitter 280. The transmit path continues to the coding block 284 which can apply forward error correction encoding that improves the integrity of the signal stream over the wire line pair 20. An example would include Reed-Solomon (RS) forward error correction coding the 280.

Next, the encoded bits from the coding block 284 can be converted to a frame of two dimensional transmission symbols to which the Inverse DFT (IDFT) function 286 is applied. The IDFT function 286 can be applied after appropriate conjugate mirroring of the frame according to one of the existing communications standards such as the T1.413-1995 standard entitled "Public Communications-Asymmetric Digital Subscriber Line Metallic Interface,'" 1995, incorporated herein by reference.

The conjugate symmetry enforced by the IDFT function 286 causes the output to be completely real. Next, a cyclic prefix (CP) is created at the CP function 288 from the last samples of the frame of real data and concatenated to the beginning of the frame. The resulting frame of data can be passed through the Digital to Analog Converter (DAC) 290 where it is converted into a suitable analog equivalent signals appropriate for transmission on the wire line pair 20.

The analog signal is transmitted through the analog front end 292 which can include an appropriate transmit filter that provides the appropriate low pass and high pass filtering functions depending on the desired spectrum of the transceiver 200. In one embodiment the filtering functions provided by the analog front end 292 ensure the transmitted signal does not exceed the T1.413 power spectral density mask. The analog front end 292 can contain the appropriate line drive circuits utilized to provide the current and/or voltage gains required to place the filtered signal onto the wire line pair 20 with an ADSL format at the appropriate power level. This provides a mechanism for increasing or reducing the power of signals transmitted on the wire line pair by the transmitter 280. According to one embodiment, power levels of the transmitted signals are reduced in order to avoid the nonlinearities that occur when voice band devices, such as a POTS 10, seize the wire line pair 20.

The frequency spectrum which carries signals from the transmitter 280 onto the wire line pair 20 can be divided into a group of operating subchannels that are forced to carry more or less bits depending on the signal to noise ratio (SNR) of a particular channel. In one embodiment, a small subset of the operating subchannels are forced to carry fewer bits than they are capable of supporting. This provides the receiver 210 with the ability to estimate the position and amplitude of nonlinearities within a subchannel. Thus, it is possible to reduce the subchannel modulation to a more robust signal modulation scheme such as a symbol constellation composed of four points (4-QAM). The result of 4-QAM modulation applies in the case of T1.413 transmission where Trellis encoding may not be applied. Similar constraints hold true when Trellis encoding is applied, i.e., two bits per subchannel will still result in a low density constellation.

Other elements of the transceiver 200 include the on/off-hook detector 300 which is able to detect the state of the voice band device coupled to wire line pair 20. Transition signals corresponding to a change in state of such a voice band device appear at the output 302 of the on/off-hook detector 300 and drive the impedance analyzing function 304. As shown, the impedance analyzing function 304 has a second input 306 coupled to the output of the analog front end 212 in the receiver 210. Thus, the impedance analyzing block 304 is able to determine when a change has occurred on the wire line pair 20 and thereby analyze the transmission line characteristics of transmission channels over the wire line pair 20.

As shown, the impedance analyzing block 304 drives a control logic block 310 which performs the actions necessary to adapt to new line conditions corresponding to state changes of voice band device coupled to the wire line pair 20. For example, the control logic block 310 can alter the power of the transmitter 280 depending on whether a POTS 10 coupled to the wire line pair 20 is on-hook or off-hook. The power control line 312 can be used for this purpose.

Other actions of the control logic block 310 include selecting the echo cancellation coefficients used by the echo canceller 230 and the equalizer coefficient used by the FEQ function 222. In this way, the control logic block 310 is able to adjust the transmission line characteristics of the transceiver 200. The EC select line 316 and FEQ select line 318 can be used for these purposes. Still another function of the control logic block 310 includes initiating requests for retransmissions to compensate for frames lost during a change in state.

In one embodiment, the control logic block 310 includes a memory space (not shown) for storing transmission line parameters corresponding to the on-hook/off-hook state of voice band devices. These transmission line parameters can include the EC and FEQ parameters but other signal processing parameters that change with line conditions are also included. Specifically, the invention contemplates adaptation of all signal processing functions required to best adapt the DSL modem 30 to either the on-hook or off-hook conditions of the voice band devices coupled to the wire line pair 20.

The transmission line parameters can be arranged as transmission profiles which are retrieved and implemented as a voice band device coupled to the wire line pair 20 changes states. In this way, an on-hook profile and an off-hook profile can be defined and utilized by the transceiver 200 for at least two operating conditions of the wire line pair 20. In one embodiment the transceiver 200 is able to dynamically switch between the transmission profile in response to changes over the line 20 to accommodate changes in channel characteristics. The transmission line profiles can be recalled at transition points 144, 146, 148 shown in FIG. 4 as detected by the on/off-hook detector 300.

Figure 6:
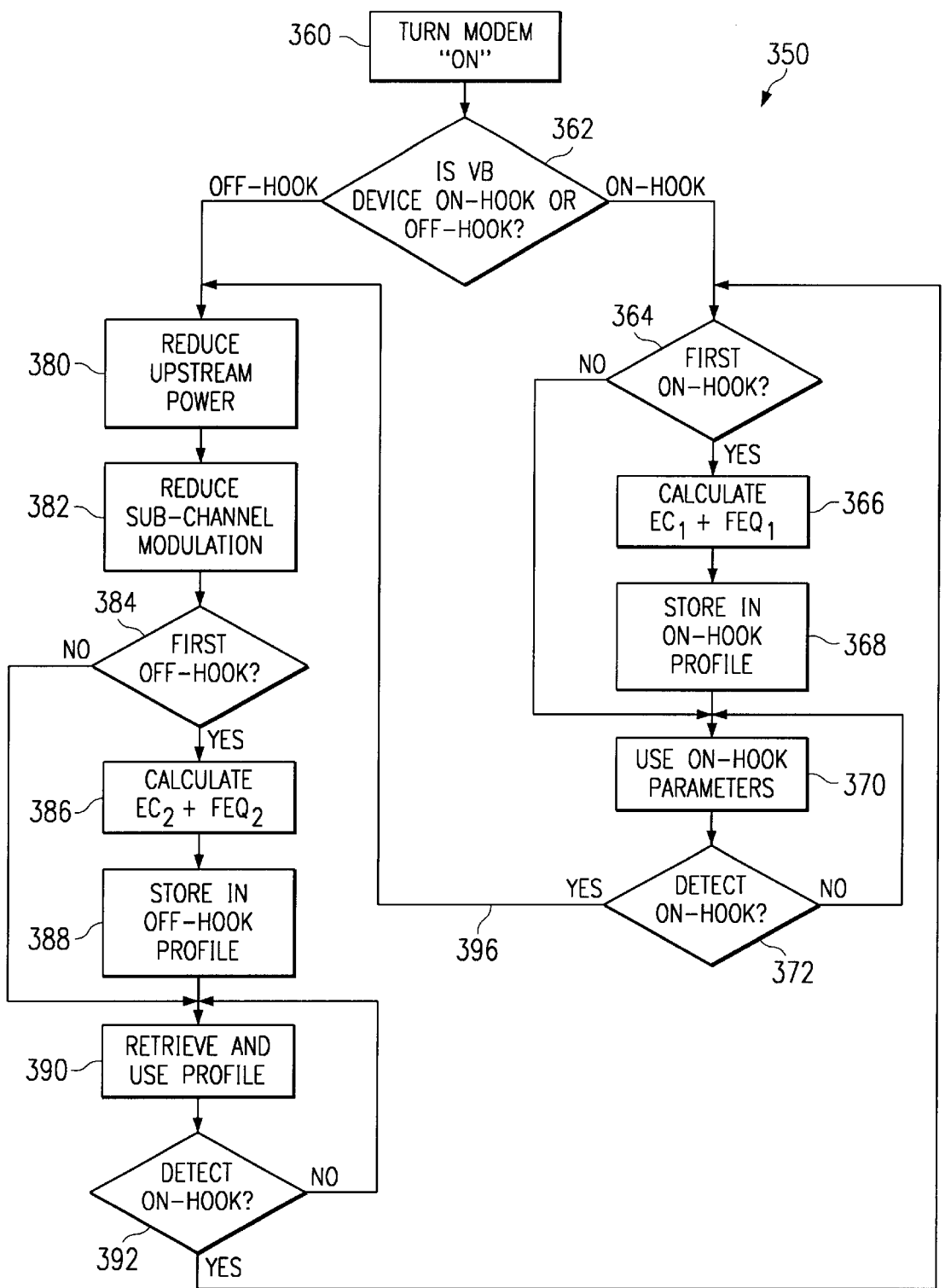
FIG. 6 is a process flow diagram of a method for training a DSL modem to operate over the same connection as a voice band device.

With reference to FIG. 6 therein is shown a process flow diagram for a power reduction scheme 350 suitable for use during training and operation of a DSL modem 30. The power reduction scheme 350 initiates when the DSL modem 30 is turned ON at step 360. Next, at step 362, the current on/off-hook state of the voice band device is determined. In the case where the voice band device is on-hook (meaning that it has not yet seized the wire line pair 20), process flow is directed to step 364 where it is determined if this is the first time the DSL modem 30 has detected the voice band device as being on-hook. If so, process proceeds to step 366 wherein a first set of transmission line parameters EC1 and FEQ1 are calculated based on the transmission line characteristics of the wire line pair 20.

Once EC1 and FEQ1 are determined they can be stored in an on-hook transmission profile at step 368 making the parameters available for future use during on-hook operation of the voice band device. The DSL modem 30 uses the on-hook parameters, step 370, during on-hook operation of the voice band device until it detects that the voice band device is going off-hook, step 372.

Process 350 can reach step 380 by one of two routes. First, when the voice band device is sensed to be off-hook immediately after turning the modem ON at step 360, then process flow is directed to step 380 wherein the upstream power of the modem is reduced. Alternatively, the upstream power is reduced anytime a transition to an off-hook state is reached from step 372. In addition to reducing the upstream power at step 380, the subchannel modulation over the wire line pair 20 is reduced at step 382. The purpose of step 382 is to increase the robustness of the transmission channel for upstream bands. In one embodiment, the subchannel modulation is reduced to 4-QAM.

Next, process flow is directed to step 384 wherein the DSL modem 30 determines if this is the first time the voice band device has gone off-hook. If so, then at step 386 the analyzer block 304 and control logic block 310 work together to calculate the echo cancellation coefficients EC2 and frequency equalizer coefficients FEQ2 for use during off-hook operation of the voice band device. The transmission line parameters (EC2 and FEQ2) can be stored in an off-hook transmission profile at step 388 for future use. The DSL modem 30 is now ready to retrieve and use the profile during off-hook operation of the voice band device, step 390. An alternative route to step 390 is where subsequent off-hook conditions of the voice band device are detected from step 384.

Next, the DSL modem awaits a transition to on-hook state of the voice band device as step 392. Process paths 394 and 396 illustrate the transitions between on-hook operation of the voice band device to off-hook operation.

As shown, in steps 380 and 382 the upstream power and subchannel modulation of the DSL modem are reduced in order to avoid non-linearities of the voice band device coupled to the wire line pair 20. According to another embodiment the upstream transmission is reduced to a single pilot tone. The pilot tone within the transmission subchannel can be modulated to provide a minimal very low rate upstream control channel. Thus the impedance analysis block 304 of the transceiver 200 can determine the type of event that occurred on the wire line pair 20 by analyzing the received pilot tone. The analysis output of the impedance analysis block 304 can be used to feed the control logic block 310 which performs the actions required to adapt to the new line condition.

According to another embodiment the upstream power is set to a reduced level at step 380 and never scaled up or down again during the communication session. The effect of reducing the upstream power to a permanent reduced level is that it will appear as greater attenuation and lower the upstream throughput. For example, the upstream power can be reduced by approximately 15 dB thereby reducing the nonlinear echo to a negligible level. In this case, retransmissions are left to the top network layers.

According to still another embodiment the receiver 210 can be configured to produce an artificially high noise floor that is sensed by the transmitter 280. The effect of this is to lower the SNR during the training process of the transceiver 200 forcing the transmitter 280 to allocate fewer bits in the down stream transmission and making it more robust. It should be understood that other power reduction schemes can be utilized in order to avoid the nonlinearities of a voice band device coupled to the wire line pair 20. For example, it is possible to reduce the upstream power only partially in order maintain a higher upstream rate while at the same time raising the noise floor to compensate for higher upstream power. All such power reduction schemes are contemplated within the present invention.

While the invention has been described with preferred embodiments it should be understood that modifications will become apparent to those of ordinary skill in the art and that such modifications are intended to be included with the scope of the invention as defined by the following claims.

What is claimed is:

1. A communications device that accommodates changes in transmission line characteristics over a wire line pair coupling a Plain Old Telephone System (POTS) to a centralized call exchange facility, the device comprising:

a transceiver with an analog interface coupled to said wire line pair and arranged to communicate with said centralized call exchange facility;

an on/off-hook detector coupled to said analog interface;

an impedance analyzer with a first terminal coupled to said on/off-hook detector and a second terminal coupled to said analog interface, the analyzer having an output that is the difference of line impedances between on-hook and off-hook conditions of said POTS; and control logic communicably coupled to said output of said impedance analyzer and configured to dynamically adjust the transmission parameters of said transceiver in response to changes in the transmission line characteristics of said line pair as the POTS goes from an on-hook state to an off-hook state.

2. The communications device according to claim 1 wherein said control logic is further configured to reduce the transmit power of said transceiver when said POTS goes off-hook.

3. A communications device that accommodates changes in transmission line characteristics over a wire line pair coupling a Plain Old Telephone System (POTS) to a centralized call exchange facility, the device comprising:

a transceiver with an analog interface coupled to said wire line pair and arranged to communicate with said centralized call exchange facility;

an on/off-hook detector coupled to said analog interface;

an impedance analyzer with a first terminal coupled to said on/off-hook detector and a second terminal coupled to said analog interface, the analyzer having an output that is the difference of line impedances between on-hook and off-hook conditions of said POTS;

control logic communicably coupled to said output of said impedance analyzer and configured to dynamically adjust the transmission parameters of said transceiver in response to changes in the transmission line characteristics of said line pair as the POTS goes from an on-hook state to an off-hook state; and a memory space coupled to said control logic and configured to store a plurality of transmission line parameters to be used for a plurality of possible line conditions.

4. The communications device according to claim 3 wherein said plurality of transmission line parameters are arranged as profiles corresponding to on-hook and off-hook characteristics of said wire line pair as said POTS goes on-hook and off-hook, respectively.

5. The communications device according to claim 4 wherein said control logic is further configured to cause said transceiver to use the profile associated with the corresponding on-hook/off-hook state of said POTS.

6. A communications device that accommodates changes in transmission line characteristics over a wire line pair coupling a Plain Old Telephone System (POTS) to a centralized call exchange facility, the device comprising:

a transceiver with an analog interface coupled to said wire line pair and arranged to communicate with said centralized call exchange facility;

an on/off-hook detector coupled to said analog interface;

an impedance analyzer with a first terminal coupled to said on/off-hook detector and a second terminal coupled to said analog interface, the analyzer having an output that is the difference of line impedances between on-hook and off-hook conditions of said POTS;

control logic communicably coupled to said output of said impedance analyzer and configured to dynamically adjust the transmission parameters of said transceiver in response to changes in the transmission line characteristics of said line pair as the POTS goes from an on-hook state to an off-hook state; and the transmission line parameters adjusted by said control logic include a set of receiver equalization coefficients.

7. A communications device that accommodates changes in transmission line characteristics over a wire line pair coupling a Plain Old Telephone System (POTS) to a centralized call exchange facility, the device comprising:

a transceiver with an analog interface coupled to said wire line pair and arranged to communicate with said centralized call exchange facility;

an on/off-hook detector coupled to said analog interface;

an impedance analyzer with a first terminal coupled to said on/off-hook detector and a second terminal coupled to said analog interface, the analyzer having an output that is the difference of line impedances between on-hook and off-hook conditions of said POTS;

control logic communicably coupled to said output of said impedance analyzer and configured to dynamically adjust the transmission parameters of said transceiver in response to changes in the transmission line characteristics of said line pair as the POTS goes from an on-hook state to an off-hook state; and the transmission line parameters adjusted by said control logic include a set of echo cancellation coefficients.

8. A digital subscriber line modem capable of operating in multiple transmission line profiles depending on the current transmission line characteristics of a wire line pair comprising:

an interface to the wire line pair;

a signal converter with an input terminal coupled to said interface;

a on-hook/off-hook detector coupled to the wire line pair adjacent said interface and having an on-hook/off-hook output;

an impedance analyzing block with a first input coupled to said on-hook/off-hook output and a second terminal coupled to said input terminal of said signal converter, the impedance analyzing block having an output available to a control logic block; and wherein said control logic block is configured to determine the transmission line characteristics of the wire line pair when a voice band device coupled to the wire line pair goes on-hook or off-hook.

9. A digital subscriber line modem capable of operating in multiple transmission line profiles depending on the current transmission line characteristics of a wire line pair comprising:

an interface to the wire line pair;

a signal converter with an input terminal coupled to said interface;

a on-hook/off-hook detector coupled to the wire line pair adjacent said interface and having an on-hook/off-hook output;

an impedance analyzing block with a first input coupled to said on-hook/off-hook output and a second terminal coupled to said input terminal of said signal converter, the impedance analyzing block having an output available to a control logic block;

wherein said control logic block is configured to determine the transmission line characteristics of the wire line pair when a voice band device coupled to the wire line pair goes on-hook or off-hook; and a memory space read/write accessible by said control logic block, said memory space suitable for storing a plurality of transmission line parameters.

10. The digital subscriber line modem of claim 9 wherein said transmission line parameters are stored as profiles corresponding to on-hook and off-hook conditions of a voice band device coupled to said wire line pair.

11. The digital subscriber line modem of claim 9 wherein said memory space is a non-volatile memory array.

12. A digital subscriber line modem capable of operating in multiple transmission line profiles depending on the current transmission line characteristics of a wire line pair comprising:

an interface to the wire line pair;

a signal converter with an input terminal coupled to said interface;

a on-hook/off-hook detector coupled to the wire line pair adjacent said interface and having an on-hook/off-hook output;

an impedance analyzing block with a first input coupled to said on-hook/off-hook output and a second terminal coupled to said input terminal of said signal converter, the impedance analyzing block having an output available to a control logic block; and said control logic block is configured to determine the transmission line characteristics of the wire line pair when a voice band device coupled to the wire line pair goes on-hook or off-hook and the transmission line characteristics determined by said control logic block include upstream power, echo cancellation and equalizer coefficients.

13. The digital subscriber line modem of claim 8 wherein said control block is configured to control the transmitted power of signals transmitted through said interface.

14. The digital subscriber line modem of claim 8 wherein said control logic block automatically adjusts to the on-hook or off-hook line condition depending on the on-hook or off-hook status of a voice band device coupled to the wire line pair.

15. A digital subscriber line modem capable of operating in multiple transmission line profiles depending on the current transmission line characteristics of a wire line pair comprising:

an interface to the wire line pair;

a signal converter with an input terminal coupled to said interface;

a on-hook/off-hook detector coupled to the wire line pair adjacent said interface and having an on-hook/off-hook output;

an impedance analyzing block with a first input coupled to said on-hook/off-hook output and a second terminal coupled to said input terminal of said signal converter, the impedance analyzing block having an output available to a control logic block; and said control logic block is configured to determine the transmission line characteristics of the wire line pair when a voice band device coupled to the wire line pair goes on-hook or off-hook, and said control logic block is configured to automatically perform a train for off-hook function when a voice band device coupled to the wire line pair goes off-hook.

16. The digital subscriber line modem of claim 15 wherein the train for off-hook function includes reducing the transmission power of signals transmitted through said interface.

17. A method of simultaneously operating a digital subscriber line (DSL) modem and a voice band device over the same connection comprising the steps of:

detecting when the voice band device is on-hook;

creating an on-hook transmission profile for the DSL modem when the voice band device is on-hook;

using the on-hook transmission profile to maintain a DSL session over the connection when the voice band device is on-hook; and storing the on-hook transmission profile for future use when the voice band device is on-hook.

18. A method of simultaneously operating a digital subscriber line (DSL) modem and a voice band device over the same connection comprising the steps of:

detecting when the voice band device is on-hook;

creating an on-hook transmission profile for the DSL modem when the voice band device is on-hook;

using the on-hook transmission profile to maintain a DSL session over the connection when the voice band device is on-hook;

detecting when the voice band device is off-hook;

creating an off-hook transmission profile for the DSL modem when the voice band device is off-hook;

using the off-hook transmission profile to maintain a DSL session over the connection when the voice band device is off-hook; and storing the off-hook transmission profile for future use when the voice band device is off-hook.

19. A method of simultaneously operating a digital subscriber line (DSL) modem and a voice band device over the same connection comprising the steps of:

detecting when the voice band device is on-hook;

creating an on-hook transmission profile for the DSL modem when the voice band device is on-hook;

using the on-hook transmission profile to maintain a DSL session over the connection when the voice band device is on-hook; and wherein the step of creating an on-hook transmission profile includes determining the set of transmitter and receiver coefficients that permit the DSL modem to operate within substantially linear operating regions of a DSL spectrum.

20. The method according to claim 19 further comprising the steps of:

detecting when the voice band device is off-hook;

creating an off-hook transmission profile for the DSL modem when the voice band device is off-hook; and using the off-hook transmission profile to maintain a DSL session over the connection when the voice band device is off-hook.

21. The method according claim 20 wherein the step of creating an off-hook transmission profile is preceded by the step of reducing the power of the DSL modem.

22. The method according claim 20 wherein the step of creating an off-hook transmission profile includes determining the impedance of the connection when the voice band device is off-hook.

23. The method according claim 20 further including the steps of:

storing the on-hook transmission profile within the DSL modem;

storing the off-hook transmission profile within the DSL modem;

sensing the on-hook/off-hook status of the voice band device; and re-calling the on-hook transmission profile when the voice band device goes on-hook; and re-calling the off-hook transmission profile when the voice band device goes off-hook.

24. The method according to claim 23 wherein the steps of re-calling the on-hook transmission profile and re-calling the off-hook transmission profile occur dynamically as the voice band device goes from on-hook to off-hook status, respectively.

25. The method according to claim 24 wherein the steps of re-calling the off-hook transmission profile and re-calling the on-hook transmission profile occur dynamically as the voice band device goes from off-hook to on-hook status, respectively.

26. The method according claim 19 wherein the step of creating an on-hook transmission profile includes determining the impedance of the connection when the voice band device is on-hook.

27. The method according claim 19 wherein said set of transmitter and receiver coefficients include equalization coefficients and echo cancellation coefficients.

28. A method of simultaneously operating a digital subscriber line (DSL) modem and a voice band device over the same connection comprising the steps of:
  detecting when the voice band device is on-hook;
  creating an on-hook transmission profile for the DSL modem when the voice band device is on-hook;
  using the on-hook transmission profile to maintain a DSL session over the connection when the voice band device is on-hook; and
  wherein the step of creating an on-hook transmission profile occurs the first time the voice band device is detected to go on-hook.

29. A method of simultaneously operating a digital subscriber line (DSL) modem and a voice band device over the same connection comprising the steps of:
  detecting when the voice band device is on-hook;
  creating an on-hook transmission profile for the DSL modem when the voice band device is on-hook;
  using the on-hook transmission profile to maintain a DSL session over the connection when the voice band device is on-hook;
  detecting when the voice band device is off-hook;
  creating an off-hook transmission profile for the DSL modem when the voice band device is off-hook;
  using the off-hook transmission profile to maintain a DSL session over the connection when the voice band device is off-hook; and
  wherein the step of creating an off-hook transmission profile occurs the first time the voice band device is detected to go off-hook.

30. A method of training a digital subscriber line (DSL) modem to operate simultaneously over the same connection as a voice band device, the method comprising the steps of:
  placing the voice band device in the on-hook state;
  establishing a DSL connection;
  transmitting a pilot tone over the DSL connection;
  analyzing the pilot tone to determine a set of on-hook transmission line coefficients that allow simultaneous operation of the DSL modem with the voice band device in the on-hook state.

31. The method according to claim 30 further comprising the step of saving the on-hook transmission line coefficients as an on-hook profile.

32. The method according to claim 31 wherein said on-hook profile is stored within the DSL modem.

33. The method according to claim 30 further comprising the steps of:
  placing the voice band device in the off-hook state;
  transmitting a single pilot tone in the upstream direction; and
  analyzing the pilot tone to determine a set of off-hook transmission line coefficients that allow simultaneous operation of the DSL modem with the voice band device in the off-hook state so that the DSL modem avoids the non-linear amplitude regions of the voice band.

34. The method according to claim 33 further comprising the step of saving the off-hook transmission line coefficients as an off-hook profile.

35. The method according to claim 34 wherein said off-hook profile is stored within the DSL modem.

36. The method according to claim 33 wherein the step of transmitting a single pilot tone includes modulating the pilot tone to provide a low rate upstream control channel.

37. The method according to claim 33 wherein the step of analyzing the pilot tone to determine a set of off-hook transmission line coefficients selecting echo cancellation and equalizer coefficients.

38. A method of training a digital subscriber line (DSL) modem to operate over the same connection as a voice band device, the method comprising the steps of:
  placing the voice band device in the off-hook state;
  reducing the upstream power of the DSL connection; and
  reducing the subchannel modulation for upstream bands in the DSL connection.

39. The method according to claim 38 wherein the step of reducing the subchannel modulation includes using 4-QAM modulation.

40. The method according to claim 38 further comprising the step of storing the upstream power and subchannel modulation levels in an off-hook transmission line profile.

41. The method according to claim 40 wherein said off-hook transmission line profile is stored in the DSL modem.

42. The method according to claim 38 wherein the step of reducing the upstream power of the DSL connection is performed simultaneously with the step of reducing the subchannel modulation for upstream bands in the DSL connection.

43. The method according to claim 38 wherein the step of reducing the upstream power includes setting the upstream power to a reduced level and never scaling the upstream power either up or down.

44. The method according to claim 38 wherein the upstream power is reduced by 15 dB.

45. A method of training a digital subscriber line (DSL) modem to operate over the same connection as a voice band device, the method comprising the step of presenting an artificially high noise level to the central office DSL modem.

46. The method according to claim 45 further including the steps of placing the voice band device in the off-hook state;
  reducing the upstream power of the DSL connection; and
  reducing the subchannel modulation for upstream bands in the DSL connection.

47. The method according to claim 46 wherein the step of reducing the subchannel modulation includes using 4-QAM modulation.

48. The method according to claim 46 further comprising the step of storing the upstream power and subchannel modulation levels in an off-hook transmission line profile.

49. The method according to claim 48 wherein said off-hook transmission line profile is stored in the DSL modem.

50. The method according to claim 46 wherein the step of reducing the upstream power of the DSL connection is performed simultaneously with the step of reducing the subchannel modulation for upstream bands in the DSL connection.

* * * * *